(12) United States Patent
Moll et al.

(10) Patent No.: US 9,639,469 B2
(45) Date of Patent: May 2, 2017

(54) COHERENCY CONTROLLER WITH REDUCED DATA BUFFER

(71) Applicants: Laurent Moll, San Jose, CA (US); Jean-Jacques Lecler, Sunnyvale, CA (US); Jonah Proujansky-Bell, Alviso, CA (US)

(72) Inventors: Laurent Moll, San Jose, CA (US); Jean-Jacques Lecler, Sunnyvale, CA (US); Jonah Proujansky-Bell, Alviso, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 542 days.

(21) Appl. No.: 13/941,483

(22) Filed: Jul. 13, 2013

(65) Prior Publication Data

US 2014/0095809 A1 Apr. 3, 2014

Related U.S. Application Data

(60) Provisional application No. 61/707,627, filed on Sep. 28, 2012.

(51) Int. Cl.
*G06F 12/08* (2016.01)
*G06F 12/0831* (2016.01)

(52) U.S. Cl.
CPC .................... *G06F 12/0831* (2013.01)

(58) Field of Classification Search
CPC ....... G06F 12/0831; G06F 13/18; G06F 3/067
See application file for complete search history.

(56) References Cited

U.S. PATENT DOCUMENTS

| 5,317,720 | A | * | 5/1994 | Stamm et al. ................ 711/143 |
| 6,681,292 | B2 | | 1/2004 | Creta et al. |
| 7,174,430 | B1 | | 2/2007 | O'Krafka et al. |
| 8,296,525 | B1 | | 10/2012 | O'Bleness et al. |
| 2002/0087811 | A1 | | 7/2002 | Khare et al. |

(Continued)

FOREIGN PATENT DOCUMENTS

GB 2460337 A 12/2009

OTHER PUBLICATIONS

Martin MMK., et al., "Bandwidth Adaptive Snooping," Proceedings of the Eighth International Symposium on High-Performance Computer Architecture, 2002. pp. 251-262, Feb. 2-6, 2002.

*Primary Examiner* — Adam M Queler
*Assistant Examiner* — Trang Ta
(74) *Attorney, Agent, or Firm* — Muncy, Geissler, Olds & Lowe, P.C.

(57) ABSTRACT

A coherency controller with a data buffer store that is smaller than the volume of pending read data requests. Data buffers are allocated only for requests that match the ID of another pending request. Buffers are deallocated if all snoops receive responses, none of which contain data. Buffers containing clean data have their data discarded and are reallocated to later requests. The discarded data is later read from the target. When all buffers are full of dirty data requests with a pending order ID are shunted into request queues for later service. Dirty data may be foisted onto coherent agents to make buffers available for reallocation. Accordingly, the coherency controller can issue snoops and target requests for a volume of data that exceeds the number of buffers in the data store.

25 Claims, 4 Drawing Sheets

(56) References Cited

U.S. PATENT DOCUMENTS

| | | |
|---|---|---|
| 2005/0132148 A1* | 6/2005 | Arimilli et al. ............... 711/154 |
| 2005/0160240 A1 | 7/2005 | Van Doren et al. |
| 2006/0190661 A1* | 8/2006 | Ogilvie ............... G06F 13/4031 |
| | | 710/310 |
| 2006/0224835 A1 | 10/2006 | Blumrich et al. |
| 2006/0230237 A1* | 10/2006 | Sakamoto .................... 711/141 |
| 2007/0005909 A1 | 1/2007 | Cai et al. |
| 2007/0038814 A1 | 2/2007 | Dieffenderfer et al. |
| 2007/0130382 A1* | 6/2007 | Moll et al. ...................... 710/22 |
| 2008/0209133 A1 | 8/2008 | Ozer et al. |
| 2010/0058000 A1 | 3/2010 | Moyer et al. |
| 2010/0064108 A1 | 3/2010 | Harris et al. |
| 2010/0185821 A1 | 7/2010 | Paver et al. |
| 2010/0205377 A1* | 8/2010 | Moyer ................ G06F 12/0831 |
| | | 711/146 |
| 2010/0287342 A1* | 11/2010 | Greenberg et al. ........... 711/146 |
| 2013/0042077 A1* | 2/2013 | Mannava et al. ............. 711/146 |
| 2014/0095807 A1 | 4/2014 | Moll et al. |
| 2014/0095808 A1 | 4/2014 | Moll et al. |
| 2014/0108744 A1 | 4/2014 | Moll |

* cited by examiner

COHERENCY CONTROLLER WITH REDUCED DATA BUFFER

CROSS REFERENCE

This application claims priority under 35 USC 119 from U.S. Provisional Application Ser. No. 61/707,627 filed on Sep. 28, 2012, titled SIMPLIFIED CONTROLLER WITH PARTIAL COHERENCY by inventor Laurent Moll, the entire disclosure of which is incorporated herein by reference.

FIELD OF THE INVENTION

The present invention is in the field of cache coherent multi-core processors within semiconductor chips, and more particularly to reorder buffer data storage and main memory access in such processors.

BACKGROUND

Cache coherency is used to maintain the consistency of data in a distributed shared memory system. A number of agents, each usually comprising one or more caches, are connected together through a fabric or a central cache coherency controller. This allows the agents to take advantage of the performance benefit of caches while still providing a consistent view of data across agents.

Cache coherency protocols are usually based on acquiring and relinquishing permissions on sets of data, typically called cache lines containing a fixed amount of data (e.g. 32 or 64 bytes). Typical permissions are:
  None: the cache line is not in the agent and the agent has no permission to read or write the data.
  Readable: the cache line is in the agent and the agent has permission to read the cache line content stored locally. Multiple agents can simultaneously have read permission on a cache line (i.e. multiple readers).
  Readable and writable: the cache line is in the agent and the agent has permission to write (and typically read) the cache line content. Only one agent can have write permission on a cache line, and no agent can have read permission at the same time.

There is usually a backing store for all cache lines (e.g. a DRAM). The backing store is the location where the data is stored when it is not in any of the caches. At any point in time, the data in the backing store may not be up to date with respect of the latest copy of a cache line which may be in an agent. Because of this, cache lines inside agents often includes an indication of whether the cache line is clean (i.e. it has the same value as in the backing store) or dirty (i.e. it needs to be written back to the backing store at some point as it is the most up-to-date version).

The permission and "dirtiness" of a cache line in an agent is referred to as the "state" of the cache line. The most common set of coherency states is called MESI (Modified-Exclusive-Shared-Invalid), where Shared corresponds to the read permission (and the cache line being clean) and both Modified and Exclusive give read/write permissions, but in the Exclusive state, the line is clean, while in the Modified state, the line is dirty and must be eventually written back. In that state set, shared cache lines are always clean.

There are more complex versions like MOESI (Modified-Owned-Exclusive-Shared-Invalid) where cache lines with read permission are allowed to be dirty. Other protocols may have separate read and write permissions. Many cache coherency state sets and protocols exist.

In the general case, when an agent needs a permission on a cache line that it does not have, it must interact with other agents directly or through a cache coherency controller to acquire the permission. In the simplest "snoop-based" protocols, the other agents must be "snooped" to make sure that the permission requested by the agent is consistent with the permissions already owned by the other agents. For instance, if an agent requests read permission and no other agent has write permission, the read permission can be granted. However, if an agent already has write permission, that permission must be removed from that agent before it is granted to the original requester.

In some systems, the agent directly places snoops on a bus and all agents (or at least all other agents) respond to the snoops. In other systems, the agent places a permission request to a coherency controller, which in turn will snoop the other agents (and possibly the agent itself).

In directory-based protocols, directories of permissions acquired by agents are maintained and snoops are sent only when permissions need to change in an agent.

Snoop filters may also be used to reduce the number of snoops sent to agents. Snoop filters keep a coarse view of the content of the agents and don't send a snoop to an agent if it knows that agent does not need to change its permissions.

Data and permissions interact in cache coherency protocols, but the way they interact varies. Agents usually place requests for both permission and data simultaneously, but not always. For instance, an agent that wants to place data in its cache for reading purposes and has neither the data nor the permission can place a read request including both the request for permission and for the data itself. However, an agent that already has the data and read permission but needs write permission may place an "upgrade" request to write permission, but does not need data.

Likewise, responses to snoops can include an acknowledgement that the permission change has happen, but can also optionally contain data. The snooped agent may be sending the data as a courtesy. Alternatively, the snooped agent may be sending dirty data that has to be kept to be eventually written back to the backing store.

Agents can hold permission without data. For instance, an agent that wants to write a full cache line may not request data with the write permission, as it knows it will not use it (it will override it completely). In some systems, holding partial data is permitted (in sectors, per byte . . . ). This is useful to limit data transfers but it makes the cache coherency protocol more complex.

Many cache coherency protocols provide two related way for data to leave an agent. One is through the snoop response path, providing data as a response to a snoop. The other is a spontaneous write path (often called write back or evict path) where the agent can send the data out when it does not want to keep it anymore. In some protocols, the snoop response and write back paths are shared.

Fully coherent agents are capable of both owning permissions for cache lines and receiving snoops to check and possibly change their permissions, triggered by a request from another agent. The most common type of fully coherent agent is a microprocessor with a coherent cache. As the microprocessor needs to do reads and writes, it acquires the appropriate permissions and potentially data and puts them in its cache. Many modern microprocessors have multiple levels of caches inside. Many modern microprocessors contain multiple microprocessor cores, each with its own cache and often a shared second-level cache. Many other types of agents may be fully coherent such as DSPs, GPUs and various types of multimedia agents comprising a cache.

In contrast, I/O coherent (also called one-way coherent) agents do not use a coherent cache, but they need to operate on a consistent copy of the data with respect to the fully coherent agents. As a consequence, their read and write request may trigger coherency actions (snoops) to fully coherent agents. In most cases, this is done by having either a special bridge or the central coherency controller issue the appropriate coherency action and sequence the actual reads or writes to the backing store if necessary. In the case of a small bridge, that bridge may act as a fully coherent agent holding permissions for a small amount of time. In the case of the central coherency controller, it tracks the reads and writes, and prevents other agent from accessing cache lines that are being processed on behalf of the I/O coherent agent.

In a coherency controller, most of the silicon area is used for a data store. The data store is typically used to reorder data coming from snoop responses with data coming from targets. The conventional implementation is to use a data store with enough read data buffer capacity to store almost all data that can be returned by the maximum number of pending read requests in the system. This requires a very large coherency controller since the number of pending reads can be large.

Therefore, what is needed is a coherency controller where the read data buffer is sized more modestly, using the characteristics of the traffic to dynamically allocate buffers from a pool with less capacity than the amount of data than can be returned by the total number of pending read transaction requests.

SUMMARY

The herein disclosed invention is a coherency controller and method of its operation. The coherency controller handles initiator read requests by sending snoops to coherent agents and sending read requests to a target. For ordered requests, to ensure that they are responded to in order, reorder buffers are used. Reorder buffers are contained in a data store unit and used to hold snoop responses for later ordered requests while an earlier ordered request is pending to the target.

Buffers within the data store are allocated dynamically as snoops are issued. Buffers containing clean data have their data discarded so that the buffer can be reallocated to another request.

DETAILED DESCRIPTION

Figure 1:
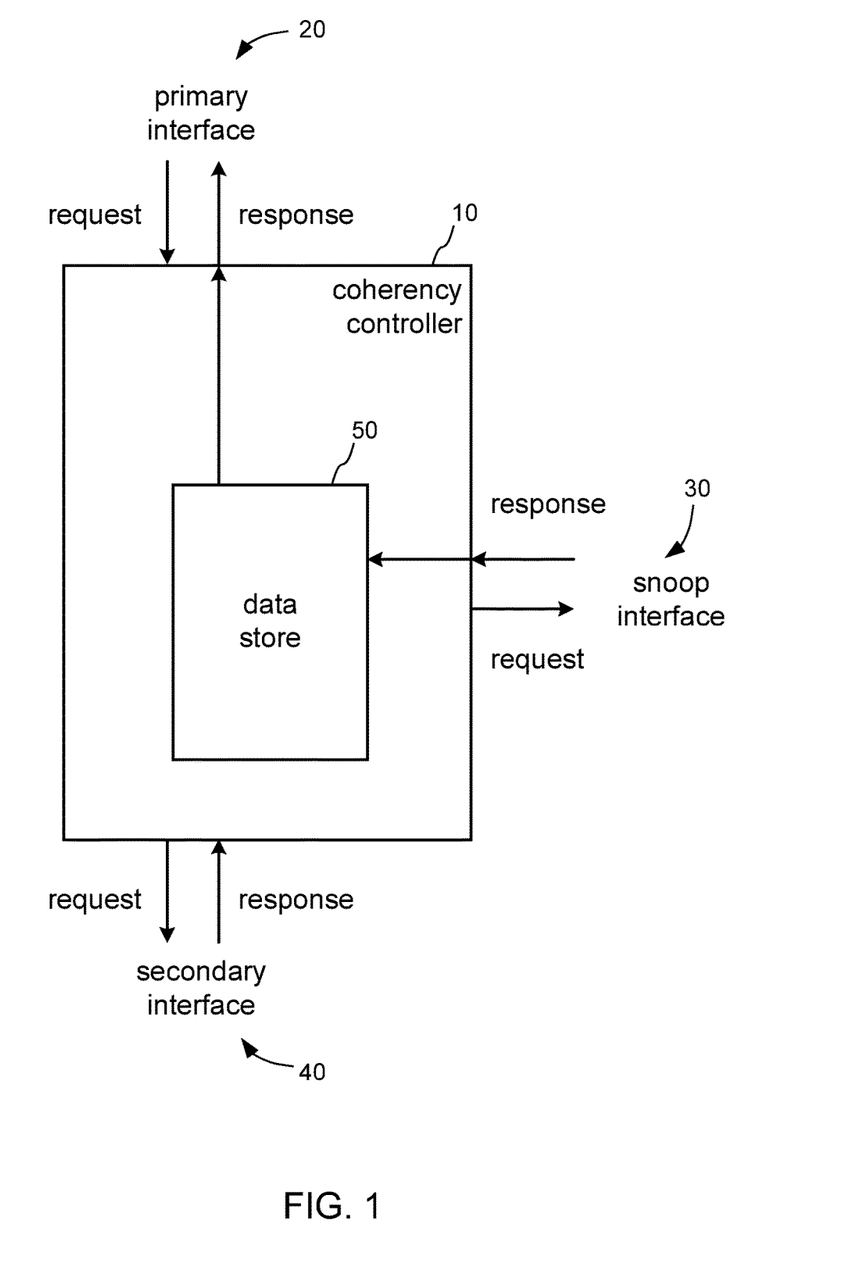
FIG. 1 shows the interfaces of a coherency controller according to the preasent invention.

FIG. 1 shows a portion of a system that includes a coherency controller 10 according to the present invention. The coherency controller 10 is connected to one or more initiator agents through primary request/response interface 20, to one or more coherent agents through snoop request/response interface 30 and to one or more target agents through target request/response interface 40. In accordance with various aspects of the present invention some coherent agents are both initiator agents and coherent agents. Such agents are connected to the coherency controller 10 through both primary request/response interface 20 and snoop request/response interface 30.

The coherency controller 10 handles the requests received on primary request interface 20. In particular, it tracks read requests from the time they are received to the time the corresponding response is sent on primary response interface 20.

Data store 50 contains data buffers to store data temporarily. Buffers of the data store 50 can be of a fixed size equal to the size of requests, such as the size of a cache line. Alternatively, if transactions of varying sizes can be issued then buffers can be allocated to hold fractions or multiples of transactions. According to one aspect of the invention, the data store 50 is used to return data in an order compatible with the requirements of the requests received on the primary request interface 20.

When a read request is received on primary request interface 20, the coherency controller 10 sends one or more snoops on snoop interface 30. The coherent agents return responses to the snoops. Snoops of different types can be issued. In accordance with various aspects of the present invention some types request a snoop response that contains data. Other snoops do not. If a snoop is of a type that requests data, and if the cache in the coherent agent holds the requested data then the snoop response carries data. In accordance with some aspects of the present invention, the type of snoop issued is based on the state of the buffers in the data store. Different embodiments can use different criteria and algorithms. In accordance with one aspect of the present invention, only snoops that request no data are issued when there are no buffers available to allocate in the data store.

When a read request is received on primary request interface 20, the coherency controller 10 might send one or more read requests on the secondary request interface 40. Different aspects of the present inventions can choose between numerous criteria and algorithms by which to determine whether to send each read request. The target agents necessarily return the requested data on the secondary response interface 40. In some aspects of the invention, the coherency controller 10 sends one or more read requests to secondary request interface 40 only after all corresponding snoop responses are received. In accordance with some aspects of the present invention, the coherency controller sends one or more read requests on secondary interface 40 only if the snoop responses failed to provide all requested data.

In accordance with other aspects of the invention, the coherency controller 10 sends one or more requests on secondary request interface 40 before receiving any snoop responses from snoop interface 30. In other aspects, the coherency controller 10 sends one or more requests on secondary request interface 40 before receiving all snoop responses. This is commonly referred to as read speculation.

Requests sent on secondary request interface 40 may contain ordering information so that the targets return data on secondary response interface 40 according to the ordering requirements of the original requests received on primary request interface 20. In such a case, the response data received on secondary response interface 40 is sent directly as the response on primary response interface 20 without needing reordering.

Snoop response data usually arrives earlier than secondary interface responses. According to some aspects of the invention, when data is received on snoop response interface 30 at a time that does not allow coherency controller 10 to immediately use it in a response (such as because a stream of data is being transferred on secondary response interface 40), the snoop response data is buffered in data store 50. The coherency controller 10 sends the stored data on primary response interface 20 when it fulfills a response that meets the response ordering requirements of the initiator.

According to one aspect of this invention, the requests received on the primary request interface 20 include an identification number (ID). Responses to requests using the same ID must be returned to the initiator in the order that the requests were issued. This ordering method is found in a number of on-chip communication protocols such as the Advanced Microcontroller Bus Interface (AMBA) Advanced eXtensible Interface (AXI).

According to one aspect of the invention, coherency controller 10 comprises asymmetric buffering. Snoop interface 30, being disposed to relatively quick responses, has more buffering than secondary interface 40. In the configuration shown in FIG. 2, data store 50 only accepts response data from snoop interface 30.

Figure 2:
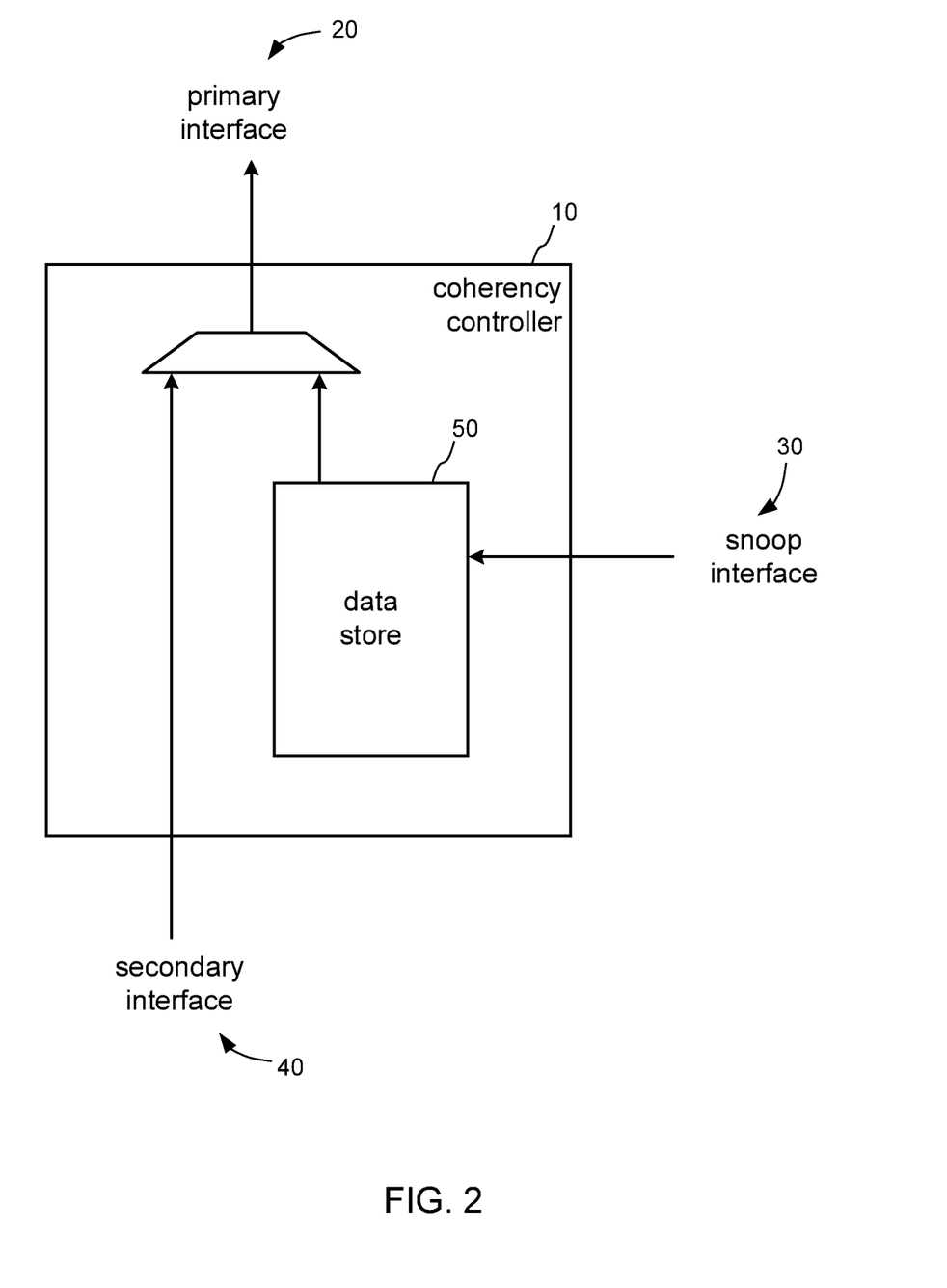
FIG. 2 shows the internal read data paths of a coherency controller according to the preasent invention.

According to another aspect of the invention, buffering is partial. More volume of snoops can be requested than there is storage capacity in data store 50. Furthermore, more volume of transactions from the primary interface 20 can be requested than there is storage capacity in data store 50. A buffer need be allocated only when there is a possibility of a second transaction receiving a response before a first transaction with the same order ID. Therefore, buffer allocation is not needed when a request is received on primary interface 20 if the ID of the request does not match the ID of any transaction pending on snoop interface 30 or secondary interface 40. If the data traffic in the system can mostly be reordered (little ID repetition) then little buffering is required. In accordance with some aspects of the present invention, buffers are allocated when a request of a pending ID is made. If, at any time during the pendency of the request, all previous requests of the same ID issue their responses then the allocated buffer is deallocated. If a request of a pending ID is made and no buffer storage can be allocated then the request is delayed with back pressure.

If responses are received from all queried coherent agent and none provides the requested data then the buffer is deallocated. At such time a request is sent to secondary interface 40 if no such request had already been speculatively issued.

If data store 50 holds data that was received from a coherent agent and the data is marked as clean then it can be discarded, and a corresponding request can be issued on secondary interface 40, if none already had been, speculatively. By so discarding clean data, it is possible to issue a total volume of snoop data requests equivalent to the sum of the amount of unallocated buffering and the amount of buffered clean data.

Furthermore, since new requests known not to require reordering need the allocation of no buffer, it is possible to issue a total volume of primary interface data requests exceeding the total size of the data store. This is the case, for example, when the new request has an ID value that is not already pending. This is also true, for example, when some transactions are of a naturally reorderable type, such as is supported by the Peripheral Component Interface Express (PCI-Express) protocol.

In other aspects buffers are allocated when a snoop response is received, rather than when a snoop is issued. Such embodiments depend on having flow control on the snoop channel.

Figure 3:
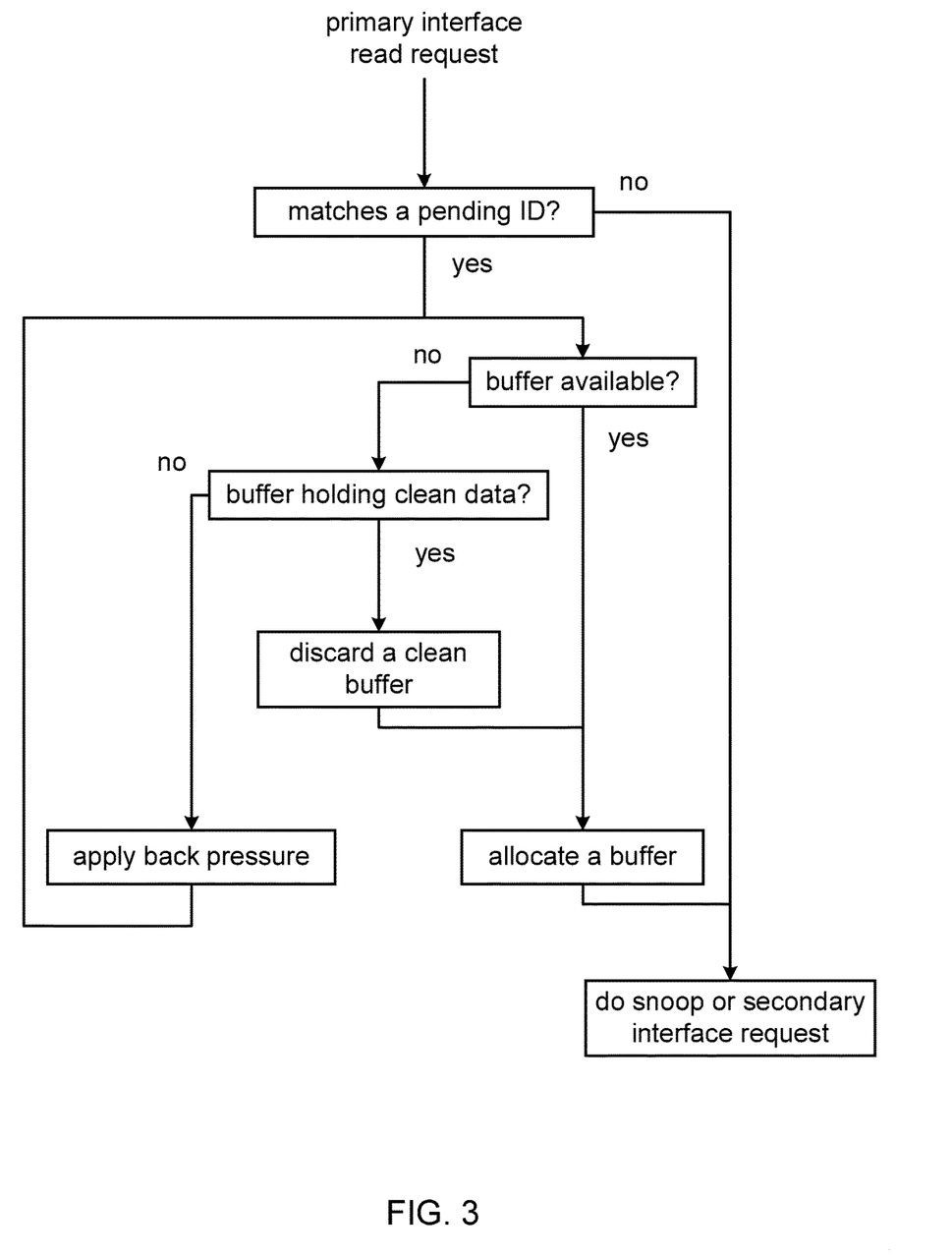
FIG. 3 is a flow chart for sending requests with or without buffer allocation according to the preasent invention.

FIG. 3 shows the method for allocating a buffer according to an embodiment of the invention in which buffers are allocated upon requests. When a request is received on the primary interface, if it matches the ID of no pending transaction then a snoop or secondary interface request is performed without allocating a buffer. If there is a match, then, if an unused unallocated buffer is available, it is allocated and the snoop or secondary interface request proceeds. If a buffer is holding clean data, but not allocated to another pending transaction, then the clean data is discarded from the buffer. It is allocated to the request, and the snoop or secondary interface request proceeds. If no buffer can be allocated, then back pressure is applied to the initiator request interface until a buffer can be allocated.

Figure 4:
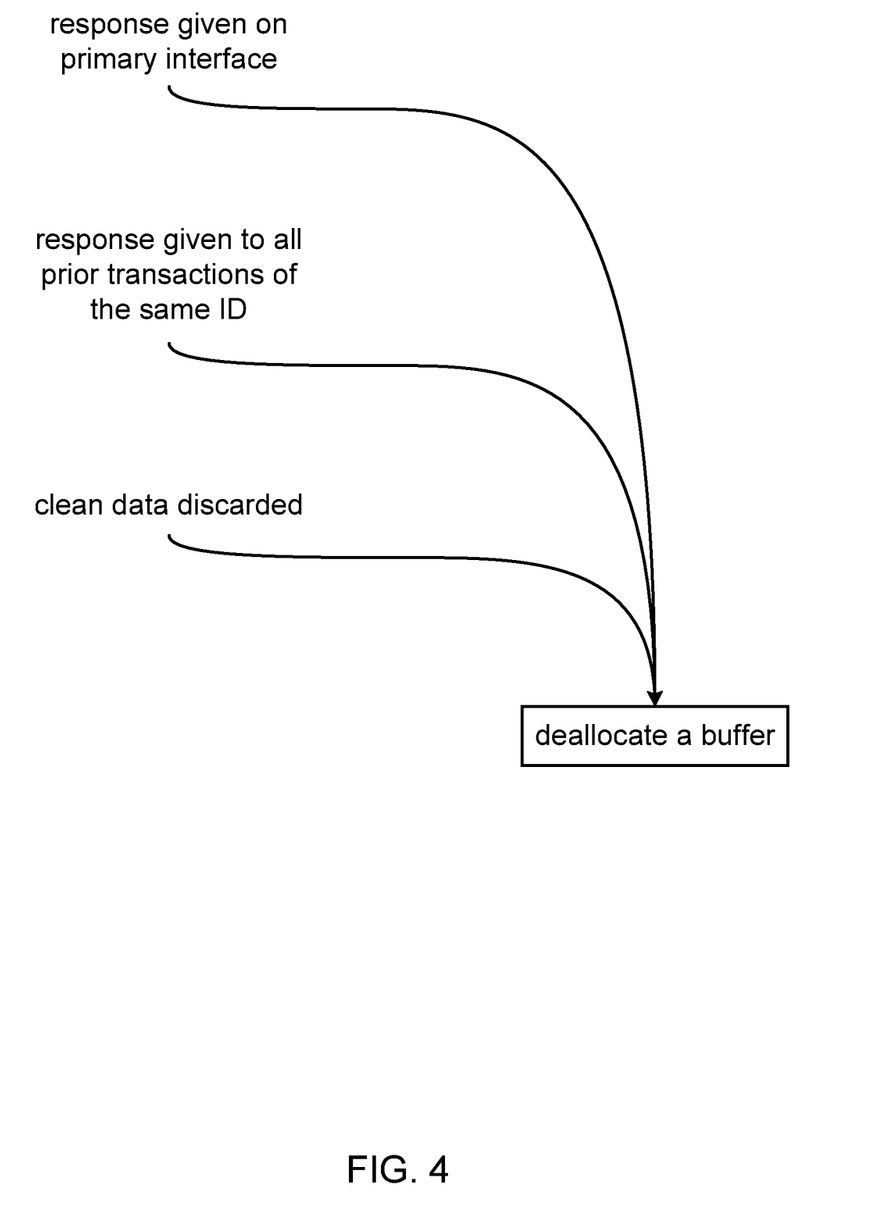
FIG. 4 is a flow chart showing the causes of buffer deallocation according to the present invention.

FIG. 4 shows the method for deallocating a buffer. When a response with data from an allocated buffer is given on the primary interface then the buffer is deallocated. When responses to all prior-issued transactions of the same ID are given then the buffer can be deallocated. When clean data is discarded then the buffer is deallocated for the purpose of reallocation to another request.

Quality-of-service

In some systems, quality-of-service (QoS) mechanisms are used to prioritize requests pending to a target on secondary interface 40. Some QoS mechanisms are: an urgency value associated with each transaction request; a sideband pressure value that causes blocked transactions to make forward progress; and a Hurry value indicating the priority required by an initiator.

A Hurry value can cause null packets of an elevated urgency to move through an interconnect network in order to create pressure and promote urgency for pending transactions. In accordance with some aspects of the present invention, a QoS value is determined by the state of the buffer. In one such aspect of the present invention, a Hurry level is one if all buffers contain dirty data and the Hurry level is zero otherwise.

Dropping Choice

When a buffer holding clean data is to drop its data and be reallocated, a choice must be made of which buffer. Various aspects of the present invention use different criteria and algorithms for the choice. In accordance with one aspect of the present invention, an urgency value, associated with each transaction, is used. Only buffers with the lowest of all pending urgencies are considered for data dropping. Of those considered, the buffer, which most recently received data, is chosen first for dropping. In accordance with another aspect, the buffer that least recently received data is chosen for dropping.

Monitor

Buffer entries can have three states: unallocated, holding clean data, holding dirty data. In accordance with one aspect the system allocates on requests (rather than responses) buffer entries and can also have a state of allocated but empty.

Some various aspects of the present invention include a monitor. The monitor tracks the number of buffers in each state. The monitor can be read by software to determine the number of buffers in each state. This can be used for software polling. Furthermore, the monitor collects histogram data. For each state there is a set of histogram counters. Within each set of histogram counters, for each clock cycle, the monitor increments one of five counters. Each counter represents whether the number of buffers in that state exceeds one of four thresholds. Of course, in accordance with other aspects of the present invention, the system can have different numbers of counters and thresholds.

Request Shunting and Queuing

If a request is received on primary interface 20, the request order ID matching that of a transaction pending on secondary interface 40, and no buffers are available then, according to one aspect of the present invention, the request is shunted into a queue. Following requests of the same ID are also shunted into the queue. That way following requests of different IDs need not be blocked by backpressure. Effectively, the reorder buffering is thereby preserved for relatively fast snoops, without becoming clogged by ordered requests after a miss. Buffer storage for requests is much smaller than buffer storage for response data. In accordance with an aspect of the present invention, the system comprises multiple queues where a queue is dynamically allocated to an ID as long as a target request is pending with that ID. In another aspect of the invention, the system comprises multiple queues, but IDs are mapped to queues using a static hashing algorithm.

In accordance with one aspect of the present invention, transactions are pulled from the head of the queue and processed when a response is received from a target. In another, transactions are pulled from the head of the queue early in order to send snoops. The transactions at the head of the queue is pulled at a time based on a prediction of the time for all coherent agents to respond to a snoop before a response is received from a request pending to the target.

Dirty Data Foisting and Replay

According to the foregoing aspects as implemented, buffers can be allocated to hold snoop response data if they are unallocated or holding clean data (by discarding the clean data). Buffers holding dirty data must not discard the data. However, to make reorder buffer entries available for urgent new requests, data is foisted from dirty buffers to coherent agents, and the request that caused the buffer to acquire the dirty data is pushed into a replay stack. The most recent transaction of an ID is foisted before less recent ones and is replayed from the stack after any other less recent requests that were foisted.

The various aspects of the present invention may be implemented in software, hardware, application logic, or a combination of software, hardware, and application logic. The software, application logic and/or hardware may reside on a server, an electronic device, or a service. If desired, part of the software, application logic and/or hardware may reside on an electronic device, part of the software, application logic and/or hardware may reside on a server.

As will be apparent to those of skill in the art upon reading this disclosure, each of the aspects described and illustrated herein has discrete components and features which may be readily separated from or combined with the features and aspects without departing from the scope or spirit of the present invention. Any recited method can be carried out in the order of events recited or in any other order which is logically possible.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein.

In accordance with the teaching of the present invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods. The article of manufacture (e.g., computer or computing device) includes a non-transitory computer readable medium or storage that includes a series of instructions, such as computer readable program steps or code encoded therein. In certain aspects of the present invention, the non-transitory computer readable medium includes one or more data repositories. Thus, in certain embodiments that are in accordance with any aspect of the present invention, computer readable program code (or code) is encoded in a non-transitory computer readable medium of the computing device. The processor, in turn, executes the computer readable program code to create or amend an existing computer-aided design using a tool. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the present invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement either a control system either in logic or via a set of commands executed by a soft-processor.

Accordingly, the preceding merely illustrates the various aspects and principles of the present invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the various aspects discussed and described herein. Rather, the scope and spirit of present invention is embodied by the appended claims.

What is claimed is:

1. A coherency controller comprising:
a primary interface to receive read requests for data from an initiator and to provide responses, including the data, to the initiator;
a snoop interface to send snoops to a coherent agent in response to the read requests received on the primary interface and to receive snoop responses from the coherent agent, wherein at least one of the snoop responses includes the data requested of a respective read request; and
a data store, comprising a pool of buffers, wherein the data store is configured to dynamically allocate at least one buffer from the pool of buffers to temporarily store the data included in the at least one snoop response, wherein a capacity of the pool of buffers is less than a volume of the data requested in the read requests pending from the primary interface.

2. The coherency controller of claim 1 wherein a volume of data requested in pending snoops exceeds the capacity of the pool of buffers.

3. The coherency controller of claim 1 wherein the data store is configured to allocate at least one buffer from the pool of buffers to a read request received at the primary interface only if the read request has, an ID matching an ID of another pending read request.

4. The coherency controller of claim 1 wherein, when a snoop of an ID is pending, and the last previous request of the ID is issued, a buffer is deallocated.

5. The coherency controller of claim 1 wherein the coherency controller is configured to determine a type of a snoop based on a number of available buffers in the pool of buffers of the data store.

6. The coherency controller for claim 1 wherein the coherency controller is configured to determine a quality-of-service value based on a number of available buffers in the pool of buffers of the data store.

7. The coherency controller of claim 1 wherein the data store is configured to not allocate any buffers of the pool of buffers to a pending read request until a snoop response, corresponding to the pending read request, is received at the snoop interface.

8. The coherency controller of claim 1 wherein, the coherency controller is configured to apply back pressure to the initiator at the primary interface when the primary interface receives a read request and none of the buffers included in the pool of buffers are available for allocating.

9. The coherency controller of claim 1 wherein the data store is configured to allocate at least one buffer from the pool of buffers in response to sending a snoop to the coherent agent on the snoop interface.

10. The coherency controller of claim 9 wherein the data store is configured to deallocate the at least one buffer when a snoop response is received if the snoop response contains no data.

11. The coherency controller of claim 1 wherein the data store is configured to discard data stored in at least one of the buffers of the pool of buffers and to reallocate the at least one buffer in response determining that the data stored in the at least one buffer is clean data.

12. The coherency controller of claim 11 wherein the data store is configured to choose the at least one buffer with which to discard the data based on a value associated with a pending read request.

13. The coherency buffer of claim 9 wherein the value is a transaction urgency.

14. The coherency controller of claim 1 further comprising a monitor.

15. The coherence controller of claim 14 wherein the monitor increments at least one counter corresponding to a state when the number of buffers in the state is beyond a threshold.

16. The coherency controller of claim 1 wherein, the data store is configured to push data stored in at least one of the buffers of the pool of buffers to another coherency controller and to deallocate the at least one buffer in response to determining that a number of the buffers contain dirty data.

17. The coherency controller of claim 1 further comprising:
a secondary interface to send read requests to a target and to receive responses from the target; and
a queue, wherein a later read request, received with an ID corresponding to a read request of an earlier read request that is pending to the target, is stored in the queue, without generating a snoop.

18. The coherency controller of claim 17 wherein the head of the queue is held until a time.

19. The coherency controller of claim 18 wherein the time is when a response to the earlier read request is received.

20. The coherency controller of claim 18 wherein the time is based on a prediction of when the response from the target will be received and a prediction of the time for all queried coherent agents to provide a response.

21. The coherency controller of claim 17 comprising a plurality of queues.

22. The coherency controller of claim 21 wherein the plurality of queues are allocated to pending ID values dynamically.

23. The coherency controller of claim 21 wherein the plurality of queues are allocated to ID values based on a hashing algorithm.

24. A method comprising:
receiving a read request for data at a primary interface of a coherency controller from an initiator;

sending snoops from a snoop interface of the coherency controller to a coherent agent in response to the read requests received on the primary interface;

receiving snoop responses at the snoop interface from the coherent agent, wherein at least one of the snoop responses includes the data requested of a respective read request; and dynamically allocating at least one buffer from a pool of buffers included in a data store of the coherency controller to temporarily store the data included in the at least one snoop response, wherein a capacity of the pool of buffers is less than a volume of the data requested in the read requests pending from the primary interface.

25. A non-transistory computer readable medium that includes program code encoded therein, which when executed by a processor directs a coherency controller to:

receive a read request for data at a primary interface of the coherency controller from an initiator;

send snoops from a snoop interface of the coherency controller to a coherent agent in response to the read requests received on the primary interface;

receive snoop responses at the snoop interface from the coherent agent, wherein at least one of the snoop responses includes the data requested of a respective read request; and dynamically allocate at least one buffer from a pool of buffers included in a data store of the coherency controller to temporarily store the data included in the at least one snoop response, wherein a capacity of the pool of buffers is less than a volume of the data requested in the read requests pending from the primary interface.

* * * * *